Oct. 7, 1930.  E. C. D'YARMETT  1,777,555

RADIATOR UNIT

Filed Nov. 16, 1927

INVENTOR
Edward C. D'Yarmett
BY
ATTORNEY

Patented Oct. 7, 1930

1,777,555

UNITED STATES PATENT OFFICE

EDWARD C. D'YARMETT, OF KANSAS CITY, MISSOURI, ASSIGNOR, BY DIRECT AND MESNE ASSIGNMENTS, TO THE FRACTIONATOR COMPANY, OF KANSAS CITY, MISSOURI, A CORPORATION OF MISSOURI

RADIATOR UNIT

Application filed November 16, 1927. Serial No. 233,644.

My invention relates to radiators and more particularly to devices of this character comprising tubular elements having lateral vanes, the principal objects of the invention being to provide fluid conducting elements of relatively high conductivity, to increase the radiating surface of vanes on a fluid conductor, to reduce the weight of radiating elements, to increase the stability and durability of elements comprising a radiator, to increase the efficiency of conduction from conductor to vanes, to construct a radiator element in sections, and to facilitate the connection of a radiator with a fluid-carrying system.

In accomplishing these and other objects of the invention I have provided improved details of structure, the preferred forms of which are illustrated in the accompanying drawings, wherein.

Figure 1:
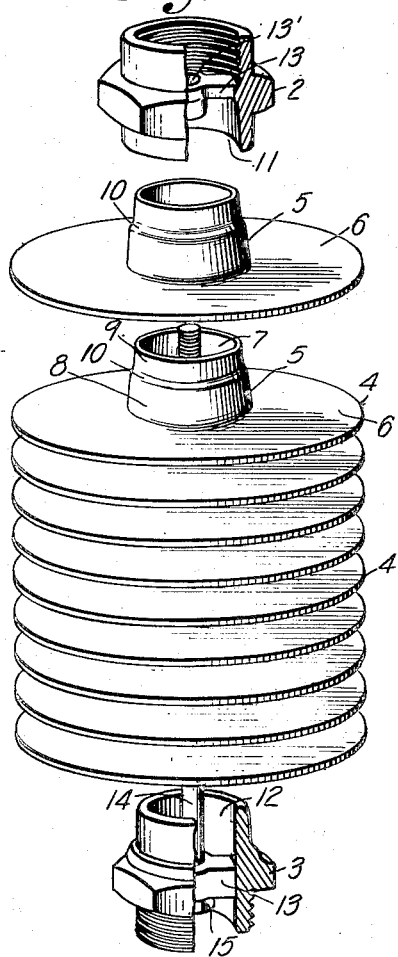
Fig. 1 is a perspective view of the component parts of a radiator embodying my invention shown in spaced relation.
Figure 2:
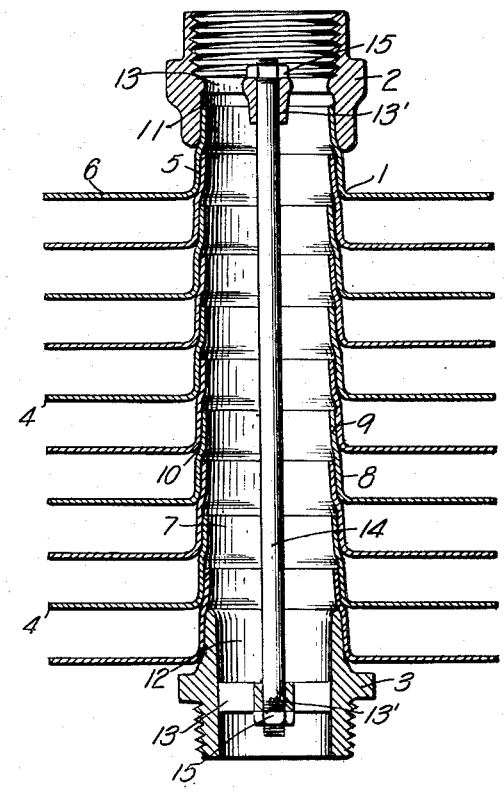
Fig. 2 is a vertical sectional view of the assembled radiator.
Figure 3:
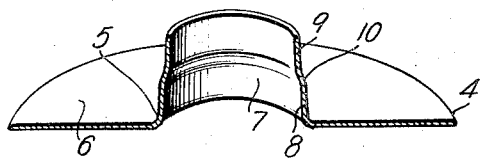
Fig. 3 is a detail sectional perspective view of a radiator element.

Referring in detail to the drawings:

1 designates a radiator adapted to be inserted between fittings such as 2 and 3 in a manner to be described, the radiator comprising a plurality of similar radiator elements 4. Each element comprises a tubular body 5 and a vane 6. In the construction of the element a piece of metal, preferably aluminum, is formed into a disk and the central portion is pressed, punched and otherwise formed to provide an axial tubular flange comprising the tubular body. The said body 5 is adapted for insertion of one body into the body of an adjacent element, and having sealing engagement therewith, for connecting a plurality of elements to comprise a radiator having a through channel 7, and to provide means for connecting fluid-circulating pipes with the radiator, as will be described. The body is tapered slightly adjacent the vane to provide a sleeve or socket member 8 and its outer end is formed to produce a more sharply tapering portion 9 whereby a shoulder 10 is produced between the sleeve and the outer tapering portion. The elements are preferably assembled by inserting the outer tapering portion 9 of one element into the sleeve 8 of an adjacent element, for frictionally sealing engagement, the shoulders stopping the outer ends of the bodies to properly space the vanes.

A plurality of the elements being provided and joined as suggested, I provide preferable means for associating them with the carrier of heating fluid including pipe fittings such as 2 and 3, one having a socket 11 to receive the tapered portion of a radiator end member and the other a tapered flange 12 for insertion into the sleeve 8 of the opposite end member, and suitable means for associating the fittings with the conducting elements of a steam system.

The pipe fittings are preferably tubular bodies provided with integral spiders 13 intermediate their ends having central apertures 13'; and a rod 14 is provided slightly longer than the assembled elements constituting the radiator, having screw threaded ends for insertion within the radiator and extension through the spiders, nuts 15 on the ends of the rod anchoring the rod in engagement with the fittings, to join the pipe fittings and securely support the radiator therebetween.

The elements being provided for assembly as described, the several elements are engaged by the partial telescoping of one body member into the body member of an adjacent element, the tapering forms of the body members facilitating the assembly, and providing tight joints sealing the channel of the assembly against leakage. The assembly is mounted on the rod which has previously been engaged with one fitting, and the rod is then engaged with the opposite fitting, securely connecting the assembled radiator with fluid-conducting elements. The assembled body members provide a continuous tube for conducting heating fluid.

The integral character of each radiator element provides for the maximum degree of heat conduction from the tube comprised of body members to the vanes. The construction provides that elements may be produced having vanes of any desired diameter, since the body members are formed integral with and from metal plates originally provided of said desired diameter. The spacing of vanes may also be provided as desired since the stop shoulders may be formed at any selected location on the body members, and no factor of installation requiring operations between the vanes, or extension of elements between the vanes, is involved.

What I claim and desire to secure by Letters Patent is:

1. In a radiator, a tubular continuous element comprising a plurality of members provided with vanes, and means for connecting the tubular element to a pipe line including pipe fittings adapted to fit opposite ends of said members and having integral spiders and a rod extensible through the tubular element and engageable with the spiders to clamp the element between the fittings.

2. In a radiator, the combination of a tubular element comprising a plurality of taper tubes adapted for engagement one with another and having annular shoulders for limiting the extension of one tube into another, vanes integral with said tubes, with complementary fittings having respectively a taper portion to fit into one of said tubes and a socket portion to receive another of said tubes, and clamping means engageable with said fittings to secure the tubular element in connection therewith.

3. The combination of a radiator comprising a plurality of plates having integral axial tubular members, means on said members for spacing the plates including means for connecting the members sealingly, fittings of a fluid conductor adapted for connection with said radiator, clamping means for securing the fittings in connection with the radiator comprising a rod, and means for engaging opposite ends of said rod with the fittings.

4. In a device of the character described including a tubular element having a tapered end and a socket at the opposite end, pipe fittings having respectively a socket to engage said tapered end and a tapered flange to engage the socket of the tubular element, and means for clamping the fittings in engagement with the tubular element.

5. In a device of the character described including a tube comprising a plurality of telescoping tapered tubular bodies, complementary pipe fittings, one having a tapered socket to receive the tapered body at one end of the tube, the other having an integral tapered flange for insertion in the body at the other end of the tube, and means for clamping the fittings in engagement with the tube.

In testimony whereof I affix my signature.

EDWARD C. D'YARMETT.